US006694236B2

(12) United States Patent
Onodera

(10) Patent No.: US 6,694,236 B2
(45) Date of Patent: Feb. 17, 2004

(54) VEHICLE-MOUNTED DEVICE CONTROL UNIT

(75) Inventor: Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/099,090

(22) Filed: Mar. 15, 2002

(65) Prior Publication Data

US 2002/0133276 A1 Sep. 19, 2002

(30) Foreign Application Priority Data

Mar. 19, 2001 (JP) ....................................... 2001-078880
Jan. 15, 2002 (JP) ....................................... 2002-006269

(51) Int. Cl.$^{7}$ ............................ G06F 7/00; G06F 19/00
(52) U.S. Cl. ............................ 701/36; 701/1; 345/160; 345/161; 180/333; 200/5 R; 200/237; 200/329
(58) Field of Search ................................ 701/1, 36, 49; 345/161, 100; 200/5 R, 179, 329, 335, 336, 339, 237, 176; 180/315, 333, 334

(56) References Cited

U.S. PATENT DOCUMENTS

| | | | | |
|---|---|---|---|---|
| 5,847,704 A | * 12/1998 | Hartman | ..................... | 345/764 |
| 5,916,288 A | * 6/1999 | Hartman | ...................... | 701/36 |
| 6,128,006 A | * 10/2000 | Rosenberg et al. | ......... | 345/163 |
| 6,225,584 B1 | * 5/2001 | Ase et al. | ................ | 200/61.54 |
| 6,404,354 B1 | * 6/2002 | Decker et al. | ................ | 341/35 |
| 6,536,825 B2 | * 3/2003 | McAndrew et al. | ...... | 296/37.13 |
| 2001/0004044 A1 | * 6/2001 | Sotome et al. | .............. | 200/5 R |
| 2001/0016794 A1 | * 8/2001 | Falck et al. | .................... | 701/50 |
| 2002/0128753 A1 | * 9/2002 | Numata et al. | ................ | 701/1 |

* cited by examiner

*Primary Examiner*—Thomas G. Black
*Assistant Examiner*—Ronnie Mancho
(74) *Attorney, Agent, or Firm*—Brinks Hofer Gilson & Lione

(57) ABSTRACT

The vehicle-mounted device control unit is provided with an electrical appliance selection switch for selecting an electrical appliance whose function is to be regulated, a manual input device for regulating various functions of the electrical appliance selected with the switch, a loudspeaker, a display unit, and a controller. Signals from the electrical appliance selection switch and the manual input device are supplied to the controller, which controls the manual input device, the loudspeaker and the display unit. The manual input device is provided with knobs, actuators for loading external forces on the knobs, and detecting devices for detecting the manipulated states of the knobs. The controller drives the actuators, the loudspeaker and the display unit by supplying drive signals matching manipulated states of the knobs and carries out force feedback to a user.

15 Claims, 11 Drawing Sheets

VEHICLE-MOUNTED DEVICE CONTROL UNIT

BACKGROUND OF THE INVENTION

1. Field of the Invention

The present invention relates to a vehicle-mounted device control unit using a manual input device with a force feedback function, and more particularly to an improving means for the force feedback function.

2. Description of the Prior Art

According to the prior art, there are already known manual input devices with a force feedback function whose knob is enabled to cause the operator to sense resistance and provide a thrust according to the quantity and direction of its manipulation to ensure accurate manipulation of the knob as the input means by enabling the operator to well feel its reaction to the manipulation.

FIG. 11 illustrates a known example of manual input device of this kind. This manual input device consists of a rotary knob 101, a detecting device 102 for detecting the quantity and direction of the rotation of the rotary knob 101, an actuator 103 for loading the rotary knob 101 with an external force, a control unit 104 for taking in a detection signal a supplied from the detecting device 102 and generating a control signal c for the actuator 103, a D/A converter 105 for digital-to-analog (D/A) conversion of control signals c supplied from the control unit 104, and a power amplifier 106 for obtaining drive power for the actuator 103 by amplifying the control signal c converted into an analog signal by the D/A converter 105. The control unit 104 consists of a CPU 104*a* and a memory 104*b*, and in the memory 104*b* are stored control signals c matching different detection signals a in a table form. The CPU 104*a* takes in the detection signal a from the detecting device 102, reads a control signal c matching the detection signal a that has been taken in out of the memory 104*b*, and supplies it to the D/A converter 105.

As the actuator 103 is thereby driven and enabled to feed back an external force to the rotary knob 101 matching the quantity and direction of its manipulation, this manual input device enables the operator to well feel its reaction to the manipulation and accordingly to manipulate the rotary knob 101 dependably.

Manual input devices of this kind are used as by-wire type gear shift units for vehicles and functional regulation apparatuses for various vehicle-mounted electric appliances including the air conditioner, radio, television, CD player and car navigation system.

When applied as a gear shift device, the force feedback function that the manual input device is provided with is used as a locking means for enabling the driver to sense a click in changing the shift lever from one range to another, and thereby to forbid improper manipulation of the shift lever from one specific range to another, for instance from the P (parking) range to the R (reverse) range or from the D (drive) range to the 2nd (second speed) range. Or when used as a functional regulation apparatus for vehicle-mounted electric appliances, the force feedback function that the manual input device is provided with would be used for facilitating fine tuning of functions by enabling the rotary knob 101 to cause the operator to sense an appropriate degree of resistance or providing an appropriate thrust to the rotary knob 101 thereby to make its manipulation lighter.

While the foregoing description refers to a case in which the manual input device is equipped with a rotary knob 101, a manual input device provided with a joystick type knob swingable in two-dimensional directions in place of the rotary knob 101 and one with a lever type knob swiveling within a fixed plane are also known.

Since any of the known vehicle-mounted device control units feeds back to the user only the external force from the actuator 103 working on the knob 101, the user would find it difficult to sense any external force working on the knob 101 when running on a rugged road for instance, and the feedback function that the vehicle-mounted device control unit is provided with cannot always be fully exerted.

Incidentally, known examples of common such rotary knobs such as a volume control knob for audio equipment are provided with a grooved pulley with teeth coaxially with the volume control knob in which one end of each of elastic pieces is intermittently engaged with a convex part of the grooved pulley so that the convex part of the grooved pulley flip the end of each elastic piece to enable the user to sense the feel and sound of the resultant click. Where different functions of different electrical appliances are to be controlled with a single knob having such a mechanical force feedback means, only one kind each of click feel and click sound can be produced in spite of the variety of electrical appliances and differences in their functions to be controlled, therefore it cannot be applied as the force feedback means for a multifunctional vehicle-mounted device control unit.

SUMMARY OF THE INVENTION

An object of the present invention, attempted to solve the problem noted above of the prior art, is to provide a multifunctional vehicle-mounted device control unit capable of allowing the force feedback function of the manual input device even under stringent conditions.

In order to solve the problem noted above, according to the invention, there is provided a vehicle-mounted device control unit having an electrical appliance selection switch for selecting an electrical appliance whose function is to be regulated, a manual input device for regulating various functions of the electrical appliance selected with the switch, a loudspeaker and a controller. Signals from the electrical appliance selection switch and the manual input device are, supplied to the controller, which controls the manual input device and the loudspeaker. The manual input device is provided with knobs to be manipulated by a user, actuators for loading an external force onto the knobs and detecting devices for detecting a manipulated states of the knobs. The controller supplies predetermined signals according to the manipulated states of the knobs to the actuators and loudspeaker.

As the vehicle-mounted device control unit is thus provided with the electrical appliance selection switch, the manual input device, the loudspeaker and the controller, and predetermined signals are supplied from the controller to the actuators for force feedback use and the loudspeaker provided on the manual input device according to the manipulated states of the knobs provided on the manual input device, the user can know the manipulated state of a knob by both the driving force of the actuator onto the knobs and the sound emitted from the loudspeaker, therefore enable the force feedback function of the manual input device to be fully exerted even under very adverse conditions such as when running on a rugged road, and can accomplish various operations on various electrical appliances quickly and accurately.

In order to solve the problem noted above, the vehicle-mounted device control unit may as well have a configuration provided with an electrical appliance selection switch for selecting an electrical appliance whose function is to be regulated, a manual input device for regulating various functions of the electrical appliance selected with the switch, a loudspeaker, a display unit and a controller, into which signals from the electrical appliance selection switch and manual input device are entered, for controlling the electrical appliance, manual input device, loudspeaker and display unit, wherein the manual input device is provided with knobs to be manipulated by a user, actuators for loading an external force onto the knobs and detecting devices for detecting manipulated states of the knobs, and wherein the controller supplies predetermined signals according to the manipulated states of the knobs to the actuators, loudspeaker and display unit.

As the vehicle-mounted device control unit is thus provided with the electrical appliance selection switch, the manual input device, the loudspeaker, the display unit and the controller, and predetermined signals are supplied from the controller to the actuators for force feedback use, the loudspeaker and the display unit provided on the manual input device according to the manipulated states of knobs provided on the manual input device, the user can know the manipulated state of a knob by three means including the driving force of the actuator on to the knobs, the sound emitted from the loudspeaker, and the image displayed on the display unit, therefore enable the force feedback function of the manual input device to be fully exerted even under very adverse conditions such as when running on a rugged road, and can accomplish various operations on various electrical appliances quickly and accurately.

The invention also provides for a configuration in which the controller synchronously supplies mutually associated signals according to the manipulated states of the knobs to the actuators and loudspeaker.

As the controller thus synchronously supplies mutually associated signals according to the manipulated states of the knobs to the actuators and the loudspeaker, no discrepancy is perceived between the contact force feedback sensed by touching the knob and the aural force feedback sensed by hearing the sound from the loudspeaker, thereby allowing the user to feel a satisfactory sense of manipulation.

The invention also provides for a configuration in which the controller synchronously supplies mutually associated signals according to the manipulated states of the knobs to the actuators, loudspeaker and display unit.

As the controller thus synchronously supplies mutually associated signals according to the manipulated states of the knobs to the actuators, the loudspeaker and the display unit, no discrepancy is perceived among the contact force feedback sensed by touching the knob, the aural force feedback sensed by hearing the sound from the loudspeaker, and the visual force feedback sensed by seeing the image displayed on the display unit, thereby allowing the user to feel a satisfactory sense of manipulation.

The invention also provides for a configuration in which the controller is integrated with the manual input device.

As this integrated configuration of the controller and the manual input device requires no alteration in the external unit, the vehicle-mounted device control unit can be readily applied to the external unit.

The invention also provides for a configuration in which a joystick type knob and a rotary knob are provided as the knobs in the first or second means of solving the problem, a first actuator for loading an external force onto the joystick type knob and a second actuator for loading an external force onto the rotary knob are provided as the actuators, and a first detecting device for detecting the manipulated state of the joystick type knob and a second detecting device for detecting the manipulated state of the rotary knob are provided as the detecting devices in the first or second means of solving the problem.

This configuration of providing the manual input device with the joystick type knob, the rotary knob, the first and second actuators for separately loading an external force onto each of these knobs, and the first and second detecting devices for separately detecting the manipulated state of each knob enables the plurality of knobs to be differentiated in use according to the type or function of the electrical appliance to be regulated, making it possible to improve the operating ease of the vehicle-mounted device control unit and make it adaptable to multiple functions. Concentric arrangement of the knobs would result in saving the installation space of each knob and thereby contribute to reducing the size of the vehicle-mounted device control unit. Further, providing each knob with a separate actuator for force feedback use would serve to minimize the required number of actuators to be provided on a vehicle-mounted device control unit. Therefore, it serves to make the configuration of the vehicle-mounted device control unit more concise than where two or more actuators are provided on a joystick type knob, thereby contributing to reducing the size, cost and power consumption of the vehicle-mounted device control unit.

The invention also provides for a configuration in which a loudspeaker provided on vehicle-mounted audio equipment is used as its loudspeaker.

The use of the loudspeaker provided on vehicle-mounted audio equipment as the loudspeaker for force feedback use dispenses with the need to specially provide a separate loudspeaker for force feedback use, and serves to make the configuration of the vehicle-mounted device control unit more concise, thereby contributing to reducing the size, cost and power consumption of vehicle-mounted device control unit.

DESCRIPTION OF THE PREFERRED EMBODIMENT

Figure 1:
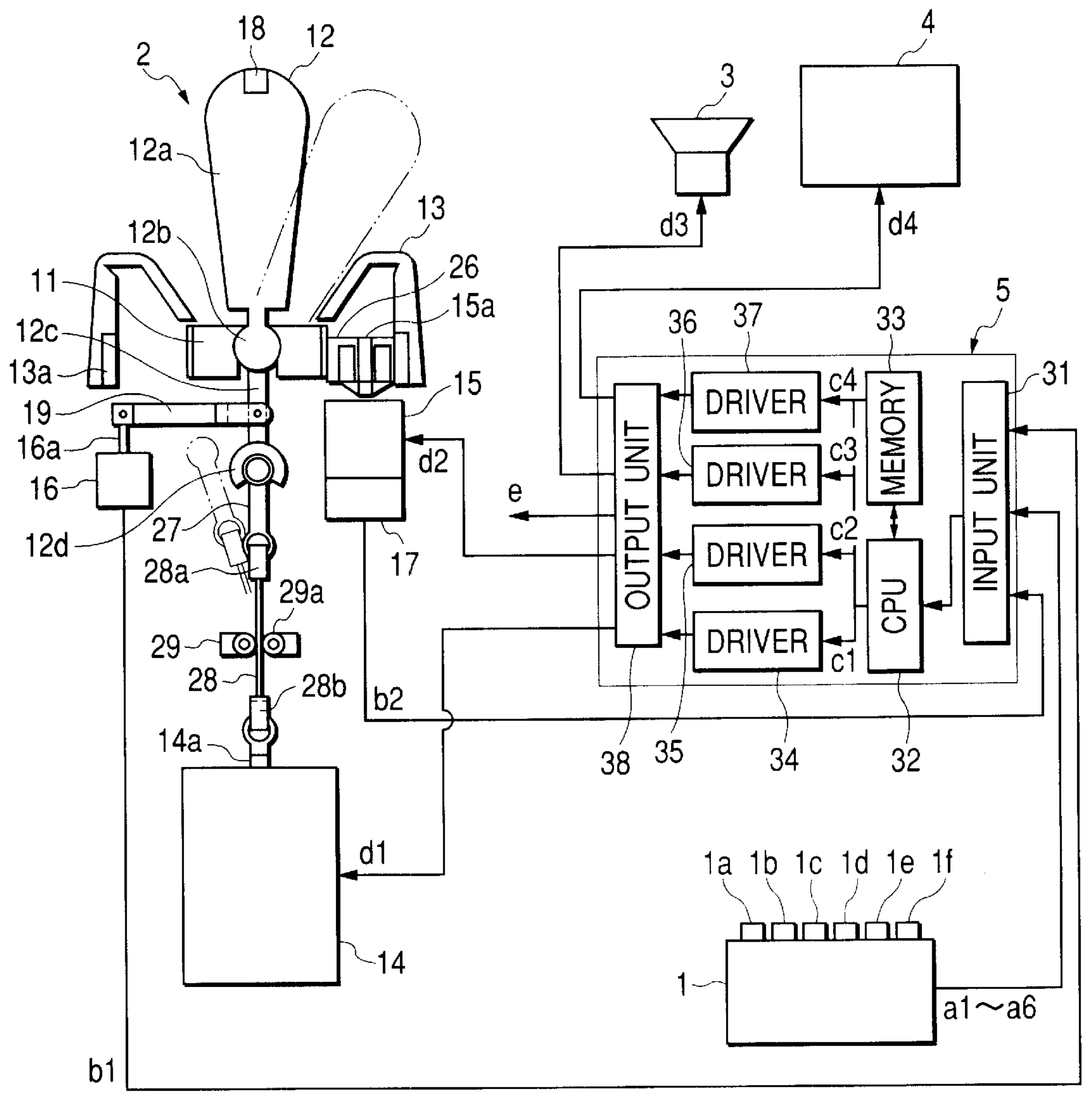
FIG. 1 illustrates the system configuration of a vehicle-mounted device control unit embodying the present invention.
Figure 2:
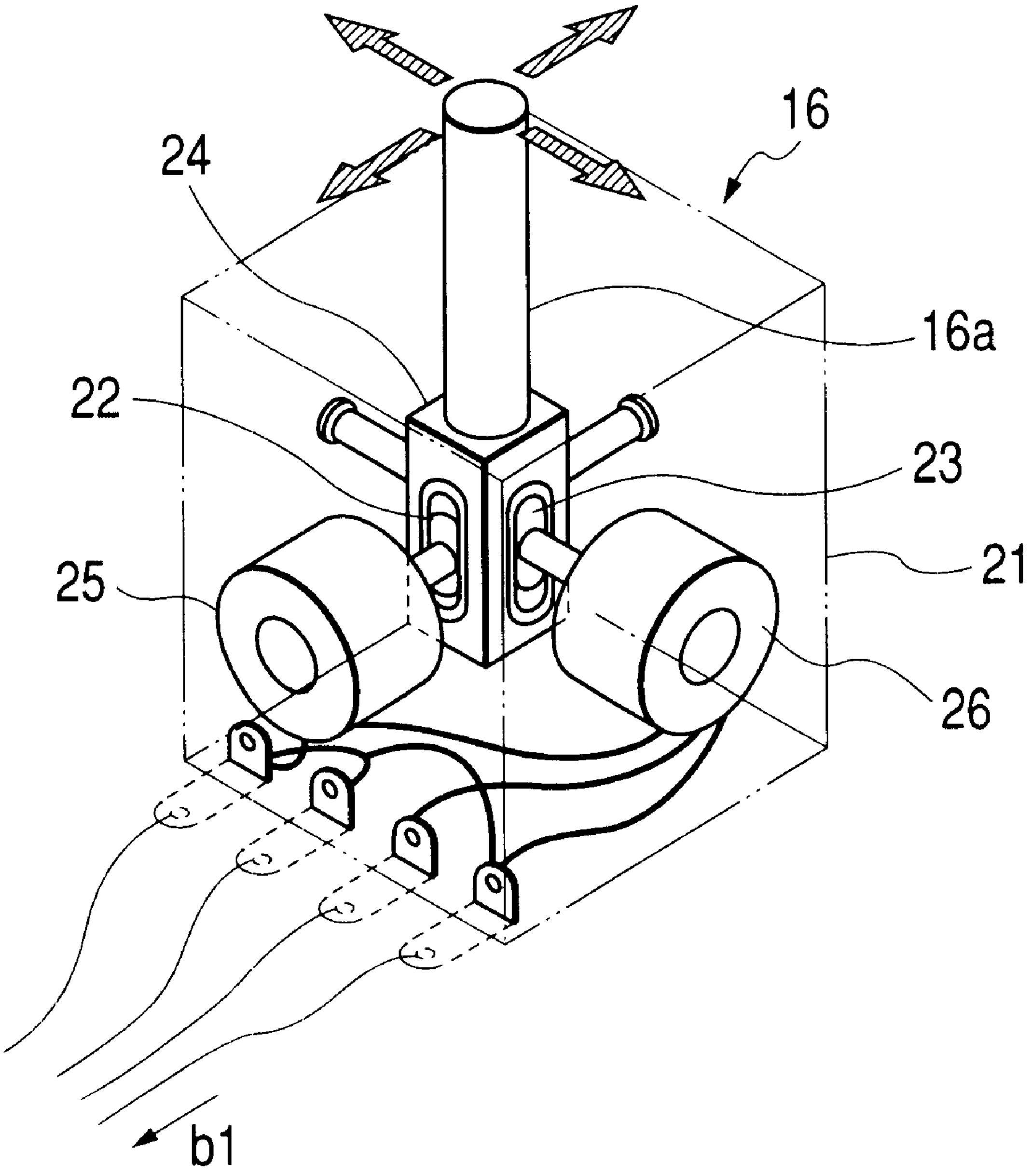
FIG. 2 is a perspective drawing illustrating the configuration of a stick controller provided in the vehicle-mounted device control unit embodying the embodiment of the invention.

One example of vehicle-mounted device control unit embodying the present invention will be described below with reference to FIG. 1 and FIG. 2. FIG. 1 illustrates the system configuration of a vehicle-mounted device control unit embodying the invention, and FIG. 2, is a perspective drawing illustrating the configuration of a stick controller.

As shown in FIG. 1, the vehicle-mounted device control unit embodying the invention in this mode mainly consists of an electrical appliance selection switch 1 for selecting the electrical appliance (not shown) whose function is to regulated, a manual input device 2 for regulating various functions of the electrical appliance selected with the switch 1, a loudspeaker 3, a display unit 4, and a controller 5 for controlling the whole system including the electrical appliances not shown, the manual input device 2, the loudspeaker 3 and the display unit 4.

The electrical appliance selection switch 1 is provided with six push-button switches 1*a,* 1*b,* 1*c,* 1*d,* 1*e* and 1*f.* By pressing one of these push-button switches, the corresponding one of prescribed selection signals a1 through a6 is supplied to select the desired out of vehicle-mounted electrical appliances such as air conditioner, radio, television, CD player, car navigation system, steering wheel tilting device, seat posture regulating device, telephone and gear shift.

The manual input device 2 is provided with a ball bearing 11, a joystick type knob 12 held swingably by the ball bearing 11, a rotary knob 13 concentrically arranged with the joystick type knob 12, a first actuator 14 for loading the joystick type knob 12 with an external force, a second actuator 15 for loading the rotary knob 13, a first detecting device 16 for detecting the manipulated state of the joystick type knob 12, and a second detecting device 17 for detecting the manipulated state of the rotary knob 13.

The joystick type knob 12 consists of a grip 12*a*, a spherical part 12*b*, a link 12*c* and a bearing 12*d*, and the spherical part 12*b* is fitted swingably to the ball bearing 11. A push-button switch 18 is fitted to part of the grip 12*a*, so that a signal supplied from the first detecting device 16 can be determined by pressing the push-button switch 18 at a prescribed timing after manipulating the grip 12*a*. To the link 12*c* is connected the manipulating lever 16*a* of the first detecting device 16. As the first detecting device 16 can be used a stick controller.

The stick controller as the first detecting device 16, as shown in FIG. 2, consists of the manipulating lever 16*a* held swingably by a case 21, a converter 24 for converting the swinging motions of the manipulating lever 16*a* into rotating motions of two rotary members 22 and 23 arranged in directions of a right angle to each other, and two rotary encoders or variable resistors 25 and 26 for converting the quantities and directions of rotation of the two rotary members 22 and 23 into electrical signals. The encoders or variable resistors 25 and 26 supply first detection signals b1 matching the quantity and direction of the swinging of the grip 12*a*.

In the rotary knob 13 which is formed in a bowl shape, an internal gear 13*a* is formed on its inner surface in the circumferential direction. A pinion 26 adhered to the drive shaft 15*a* of the second actuator 15 is engaged with the internal gear 13*a*, and the drive shaft (not shown) of the second detecting device 17 is linked to the drive shaft 15*a* of the second actuator 15. As the second actuator 15, a rotary motor such as a D.C. motor and a stepping motor can be provided. As the second detecting device 17, an encoder or a variable resistor for converting the quantity and direction of the rotation of the rotary knob 13 into electrical signals can be used, and the second detecting device 17 supplies a second detection signal b2 matching the quantity and direction of the rotation of the rotary knob 13.

As the first actuator 14, on the other hand, a linear motor such as a voice coil motor or a solenoid, for instance, is provided. The bearing 12*d* of the joystick type knob 12 and the drive shaft 14*a* of the first actuator 14 are swingably linked via a first linking member 27 and a second linking member 28. Thus, as shown in FIG. 1, the bearing 12*d* is a ball bearing, and one end of the first linking member 27 linked to it is spherical, so that the first linking member 27 is swingably linked to the joystick type knob 12. The second linking member 28 consists of a wire having at its two ends pin joints 28*a* and 28*b*, and these pin joints 28*a* and 28*b* are pinned to the lower end of the first linking member 27 and the drive shaft 14*a* of the first actuator 14, respectively. Therefore, the joystick type knob 12 and the first actuator 14 are always mechanically linked to each other irrespective of the quantity and direction of the swinging of the joystick type knob 12, so that the driving force of the first actuator 14 can be loaded onto the joystick type knob 12. To add, reference numeral 29 in the drawing denotes a wire guide, and a roller 29*a* can be installed at the tip of the wire guide 29 to smoothen the action of the second linking member 28.

As the loudspeaker 3, either a loudspeaker for force feedback use may be provided separately from the loudspeaker of vehicle-mounted audio equipment or the loudspeaker provided for vehicle-mounted audio equipment can be used as the loudspeaker for force feedback use as well. Where a special loudspeaker for force feedback use is provided, there is no need to alter the wiring and other arrangements for the vehicle-mounted audio equipment, and accordingly the vehicle-mounted device control unit can be applied to the vehicle more easily. On the other hand, where the loudspeaker provided for vehicle-mounted audio equipment is used to serve as the loudspeaker for force feedback use as well, since there is no need to separately provide a special loudspeaker for force feedback use, the configuration of the vehicle-mounted device control unit can be made more concise, making it possible to reduce the size, cost and power consumption of the vehicle-mounted device control unit.

As the display unit 4, a display device capable of displaying images such as a liquid crystal and a CRT display device for instance can be used.

The controller 5, as shown in FIG. 1, mainly consists of an input unit 31, a CPU 32 for taking in selection signals a1 through a6 and detection signals b1 and b2 entered into the input unit 31 and supplying control signals c1 through c4, a memory 33, a first driver circuit 34 for generating a drive signal d1 for the first actuator 14, a second driver circuit 35 for generating a drive signal d2 for the second actuator 15, a third driver circuit 36 for generating a drive signal d3 for the loudspeaker 3, a fourth driver circuit 37 for generating a drive signal d4 for the display unit 4, and an output unit 38.

In the memory 33 are stored data and programs for analyzing the selection signals a1 through a6 and the detection signals b1 and b2, and drive data and drive programs for the first and second actuators 14 and 15. The CPU 32 takes in the selection signals a1 through a6 and the detection signals b1 and b2, analyzes the selection signals a1 through a6 and the detection signals bi and b2 in accordance with the data and programs stored in the memory 33, determines the control signals c1 through c4 matching the selection signals a1 through a6 and the detection signals b1 and b2 in accordance with the data and programs stored in the memory 33, and supplies them to the first through fourth driver circuits 34 through 37. Each of these driver circuits 34 through 37 consists of a D/A converter for digital-to-analog (D/A) conversion of the control signals c1 through c4 supplied from the CPU 32 and a power amplifier for amplifying the D/A converted signals. It supplies the drive signals d1 through d4 to the first actuator 14, the second actuator 15, the loudspeaker 3 or the display unit 4 via the output unit 38.

The control signals c1 and c2 supplied from the CPU 32 to the first and second driver circuits 34 and 35 are signals matching the feel of manipulation provided to the knobs 12 and 13. They may make known the "generation of vibration", "generation of impacting force", "changing the operating force" or the like. A control signal to make known the "generation of vibration" expresses the intensity of vibration, the form of vibration, the duration of load, frequency and so forth. A control signal to make known the "generation of impacting force" expresses the intensity of impact, the form of impact, the number of impacts suffered and so forth. Or a control signal to make known "changing the operating force" expresses the intensity of working force, the direction of working force, the duration of load and so forth.

The control signal c3 from the CPU 32 to the driver circuit 36 expresses the feel of manipulation provided to the knobs 12 and 13 in sounds emitted from the loudspeaker 3, and is interrelated with the control signals c1 and c2. For instance, if the control signals cl and c2 notify the "generation of vibration", a matching control signal c3 capable of causing a vibration sound to be emitted will be supplied, or if the control signals c1 and c2 notify "generation of impacting force", a matching control signal c3 capable of causing an impact sound to be emitted will be supplied.

The control signal c4 from the CPU 32 to the fourth driver circuit 37 expresses the feel of manipulation provided to the knobs 12 and 13 in images displayed on the display unit 4, and is interrelated with the control signals c1 and c2. For instance, if the control signals c1 and c2 notify the "generation of vibration", there will be supplied a matching control signal c4 capable of causing an image of vibration matching the control signals c1 and c2 working on the knobs 12 and 13 under manipulation to be displayed, or if the control signals c1 and c2 notify "generation of impacting force", there will be supplied a matching control signal c4 capable of causing an image of impact matching the control signals c1 and c2 working on the knobs 12 and 13 under manipulation to be displayed.

It is preferable for the control signals c3 and c4 to be supplied in synchronism with the control signals c1 and c2 to make the knobs 12 and 13 easier to manipulate.

The controller 5 is also interconnected to electrical appliances (not shown) whose functions are to be regulated with the manual input device 2, and a control signal e for the electrical appliance matching the selection signals a1 through a6 and the detection signals b1 and b2 is supplied to regulate the required function of the electrical appliance.

The controller 5 can be configured either integrally with the manual input device 2 or as a separate device from the manual input device 2 and provided on an external unit (e.g. the body of the vehicle). Where the controller 5 is configured integrally with the manual input device 2, there is no need to alter any external unit, and the vehicle-mounted device control unit can be readily applied to any external unit. Or where the controller 5 is configured as a separate device from the manual input device 2 and provided on an external unit, the vehicle-mounted device control unit can be configured utilizing a controller provided on the external unit (i.e. a controller for the vehicle's own use), the controller 5 can be dispensed with, making it possible to provide a less expensive vehicle-mounted device control unit.

Figure 3:
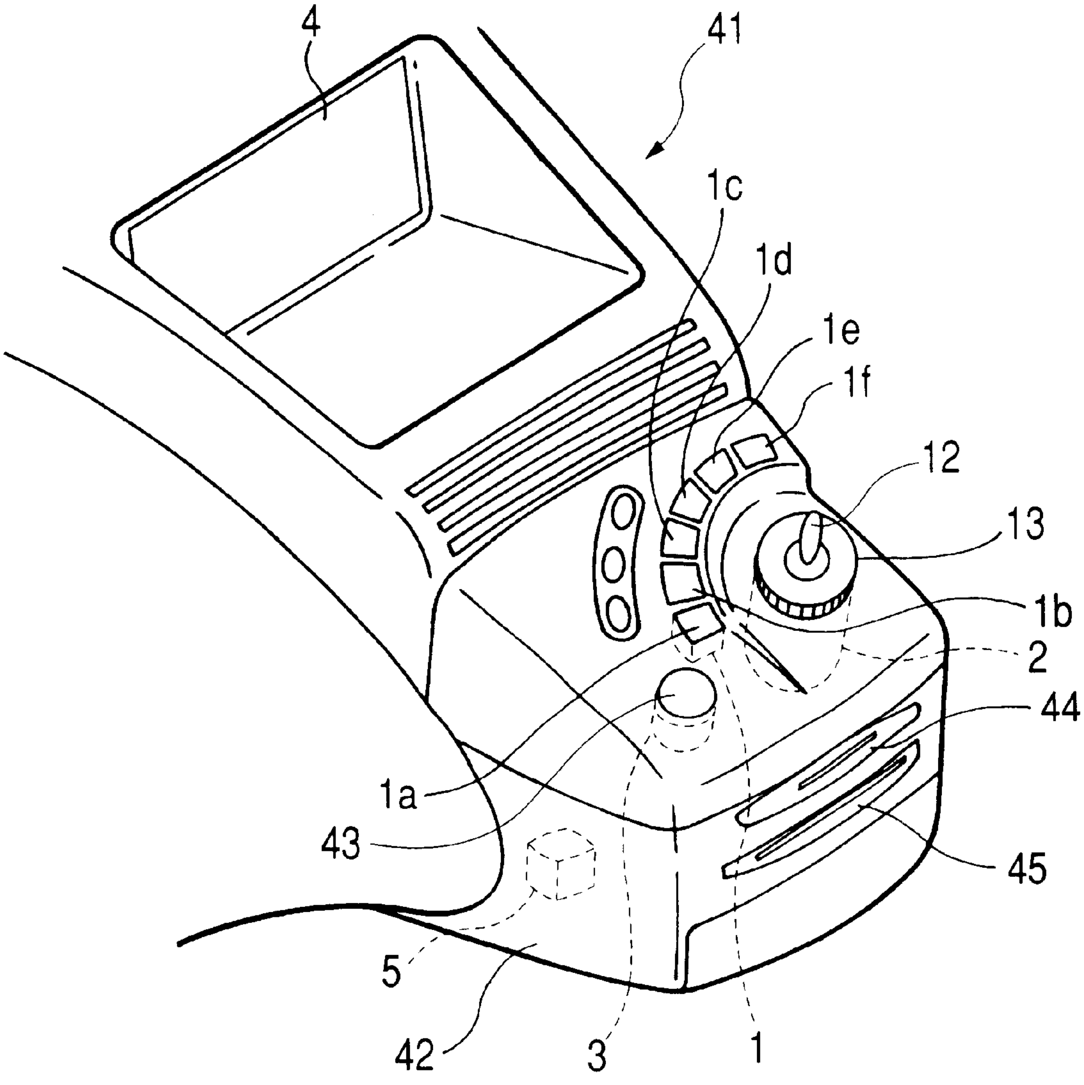
FIG. 3 is a perspective view of essential parts showing how the vehicle-mounted device control unit embodying the invention is fitted to the dashboard.

Next will be described an example of actual mounting of the vehicle-mounted device control unit embodying the present invention as described above with reference to FIG. 3 and FIG. 4. FIG. 3 is a perspective view of essential parts showing how the vehicle-mounted device control unit embodying the invention is fitted to the dashboard, and FIG. 4, a plan of essential parts showing the interior state of a vehicle fitted with the vehicle-mounted device control unit embodying the invention.

Figure 4:
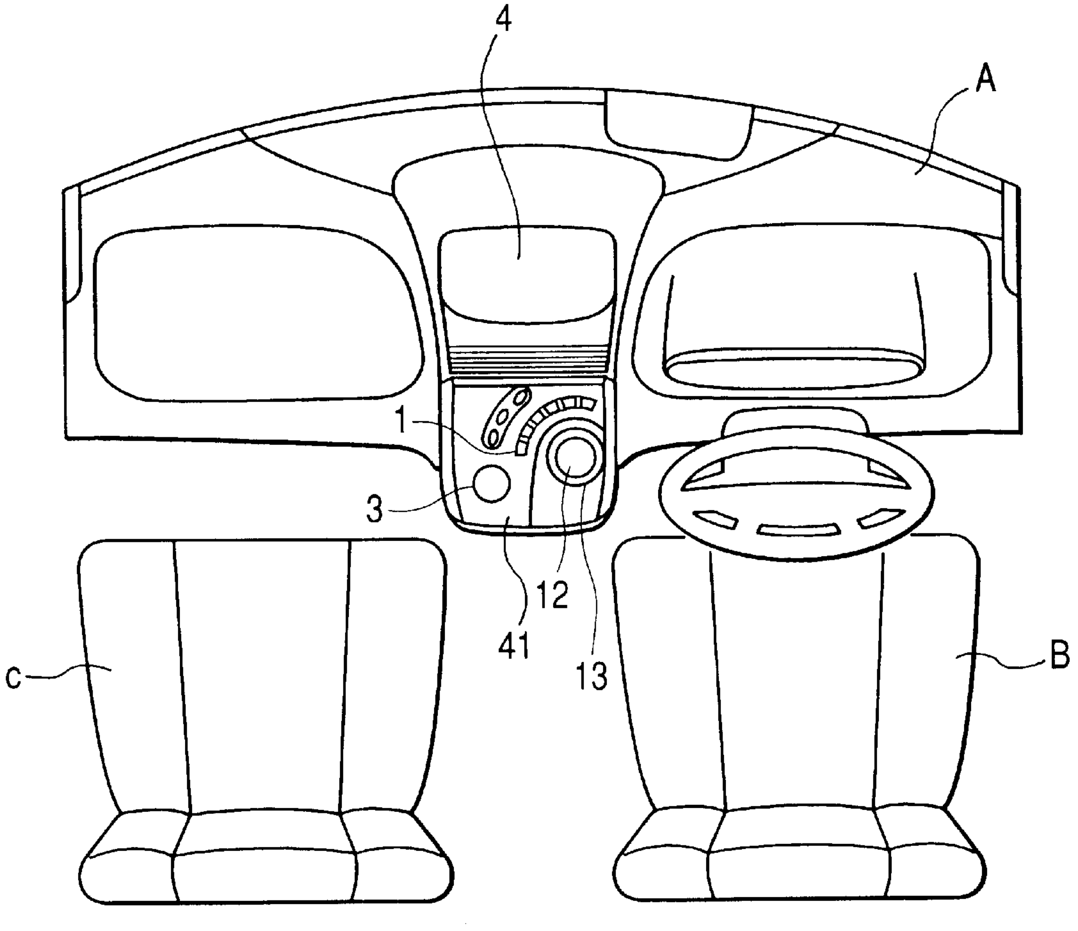
FIG. 4 is a plan of essential parts showing the interior state of a vehicle fitted with the vehicle-mounted device control unit embodying the invention.

In a vehicle-mounted device control unit 41 embodying the invention in this mode, the electrical appliance selection switch 1, the manual input device 2, the loudspeaker 3 and the controller 5 are housed in a case 42 formed in a rectangular container shape, and over the top face of the case 42 are arranged, as shown in FIG. 3 and FIG. 4, the six push-button switches 1*a*, 1*b*, 1*c*, 1*d*, 1*e* and 1*f* constituting the electrical appliance selection switch 1 and the joystick type knob 2 and the rotary knob 13 constituting the manual input device 2, with a sound hole 43 opened to let sounds emitted from the loudspeaker 3 go out. In the front face of the case 42 are opened a card slot 44 and a disk slot 45.

This vehicle-mounted device control unit 41, as shown in FIG. 4, is fitted on the dashboard A of the vehicle between the driver's seat B and the front passenger seat C. The display unit 4 is installed above the part where the vehicle-mounted device control unit 41 is fitted.

Figure 5:
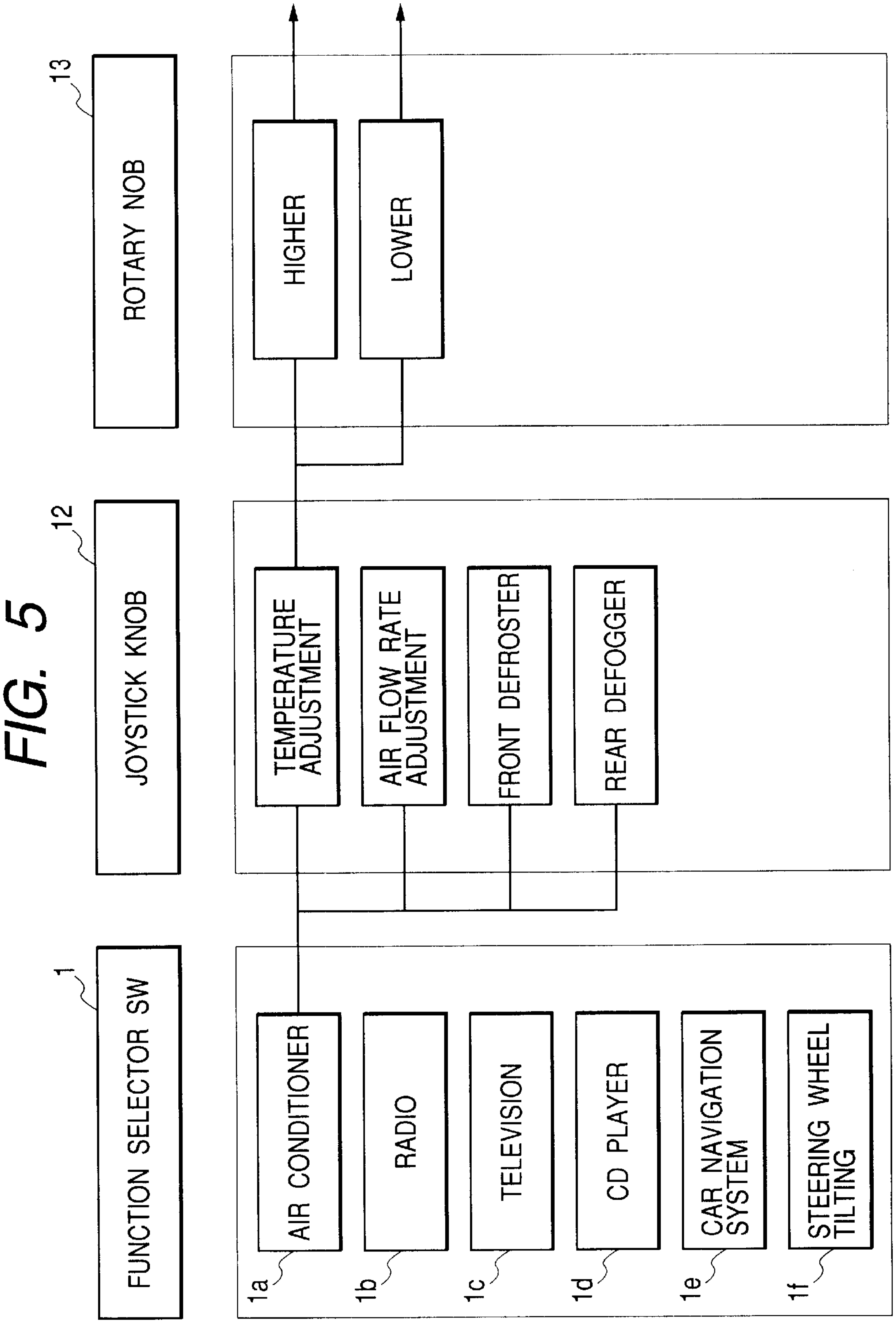
FIG. 5 is a block diagram illustrating the functions of various operating units provided on the vehicle-mounted device control unit embodying the invention.
Figure 6:
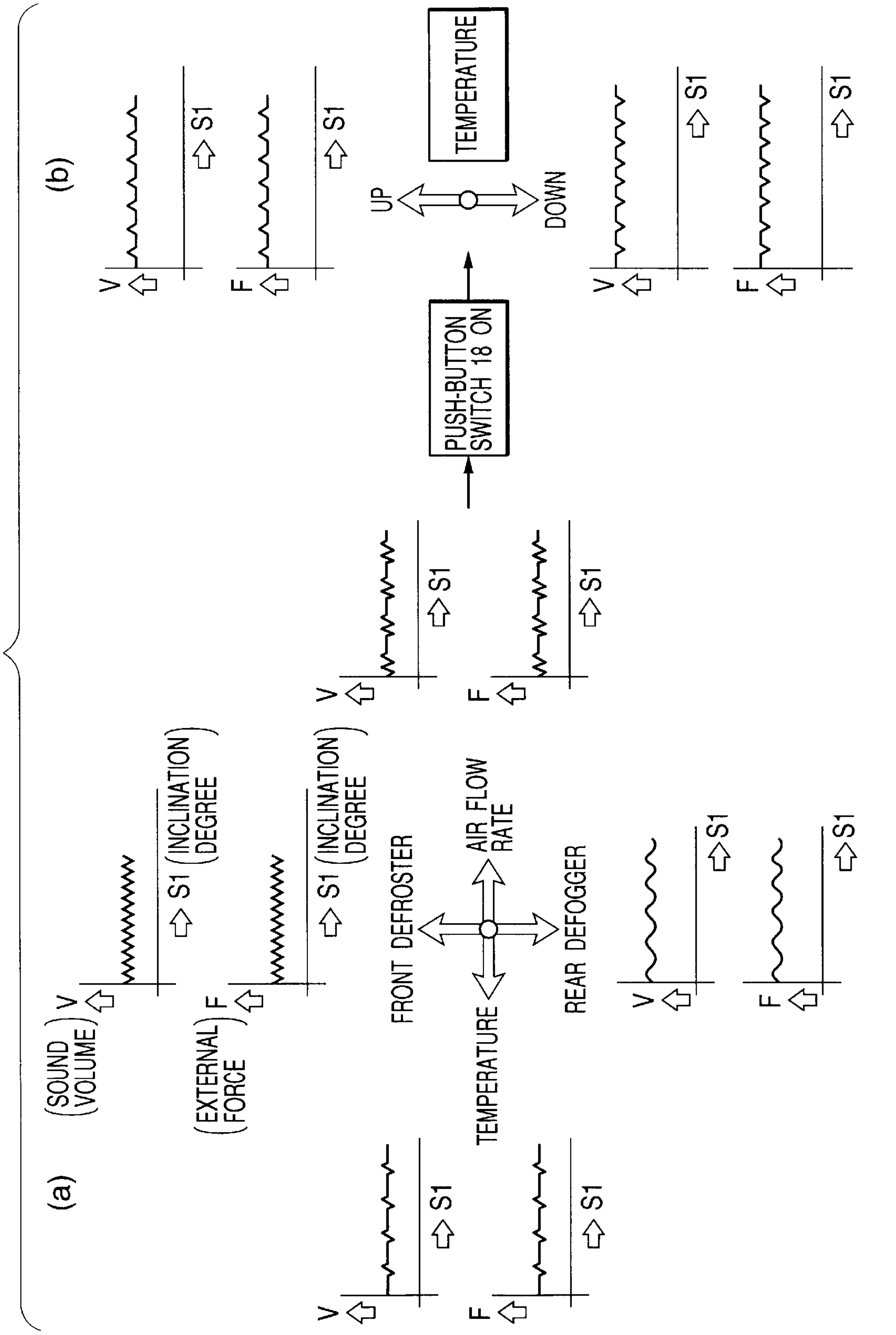
FIG. 6 illustrates the operation that takes place where a joystick type knob is applied for selection of a function and functional regulation of a vehicle-mounted air conditioner.
Figure 7:
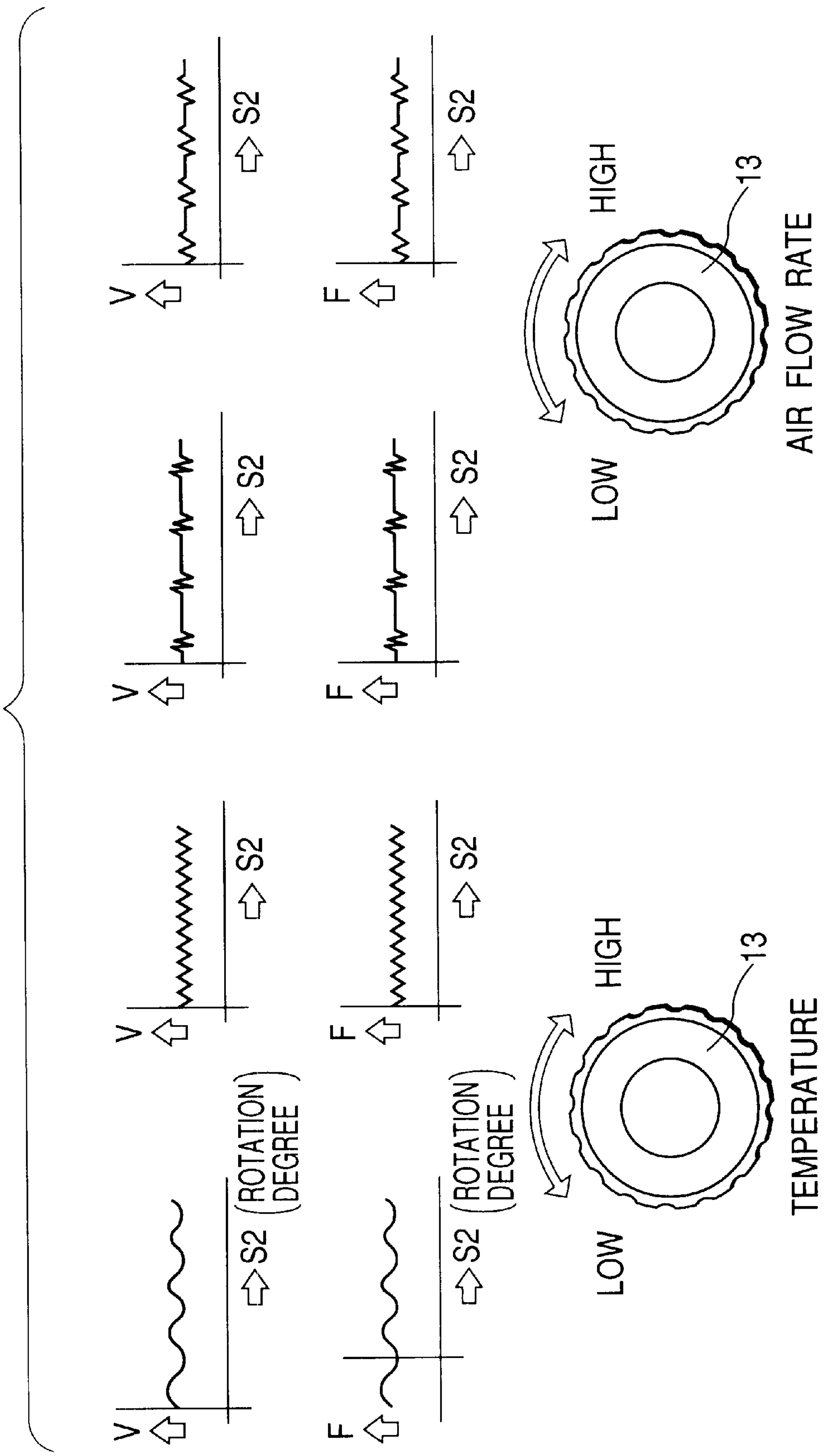
FIG. 7 illustrates the operation that takes place where a rotary knob is applied for functional regulation of a vehicle-mounted air conditioner.
Figure 8A:
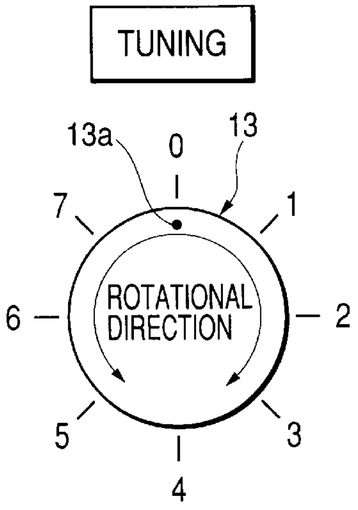
FIG. 8 illustrates the operation that takes place where a rotary knob is applied for tuning of a vehicle-mounted radio.
Figure 8B:
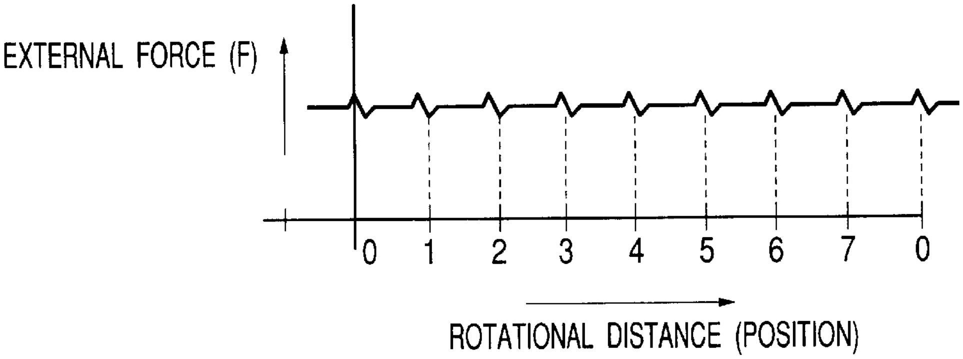
Figure 8C:
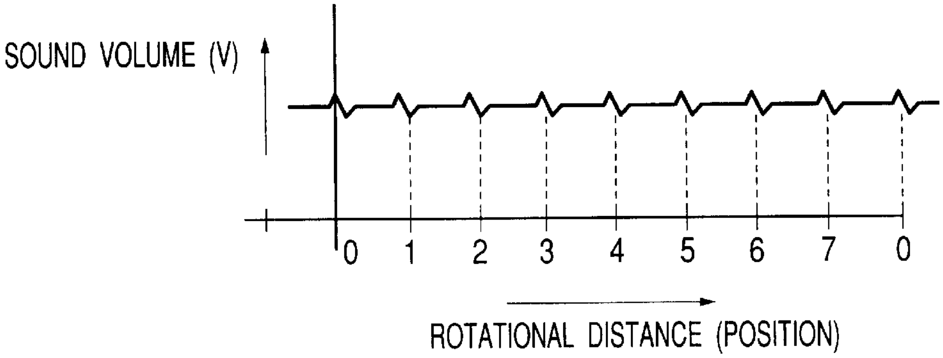
Figure 8D:
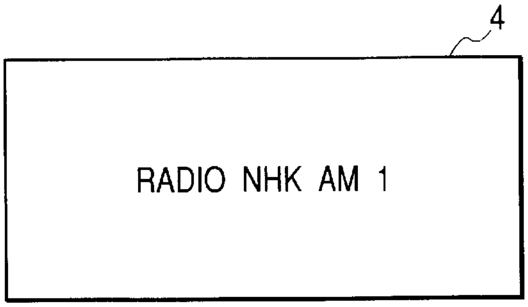
Figure 9A:
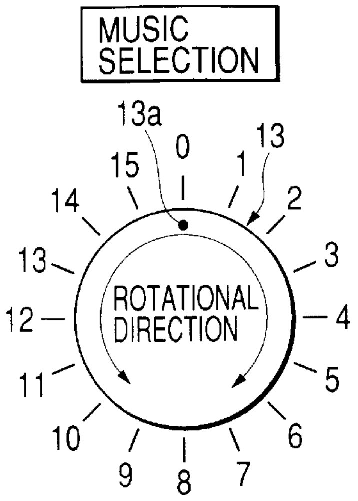
FIG. 9 illustrates the operation that takes place where a rotary knob is applied for music selection for a vehicle-mounted CD player.
Figure 9B:
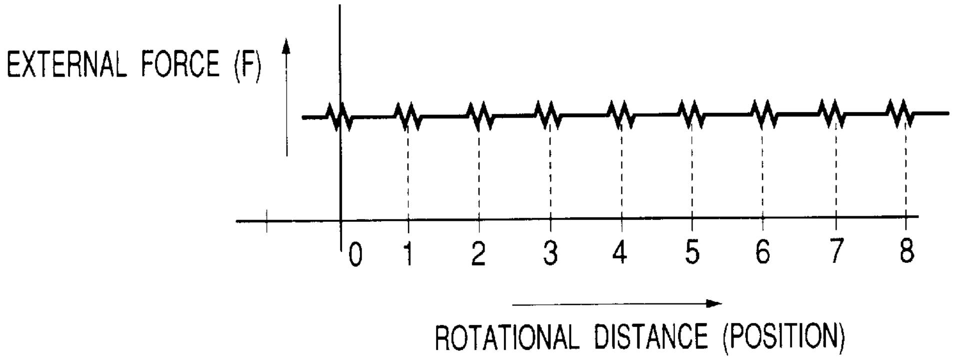
Figure 9C:
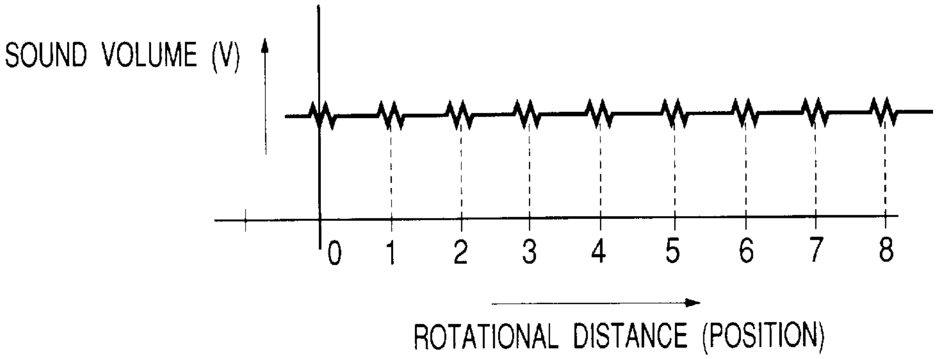
Figure 9D:
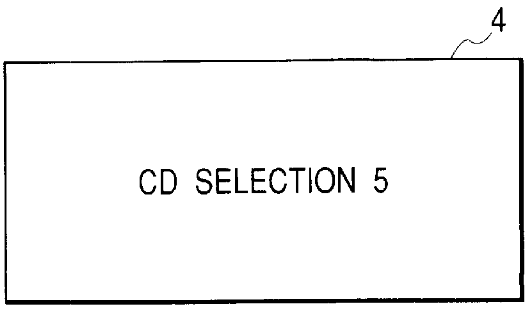
Figure 10A:
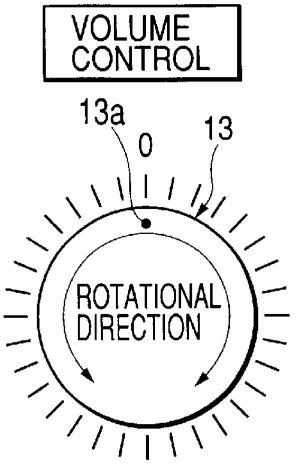
FIG. 10 illustrates the operation that takes place where a rotary knob is applied for volume control for a vehicle-mounted radio or a vehicle-mounted CD player.
Figure 10B:
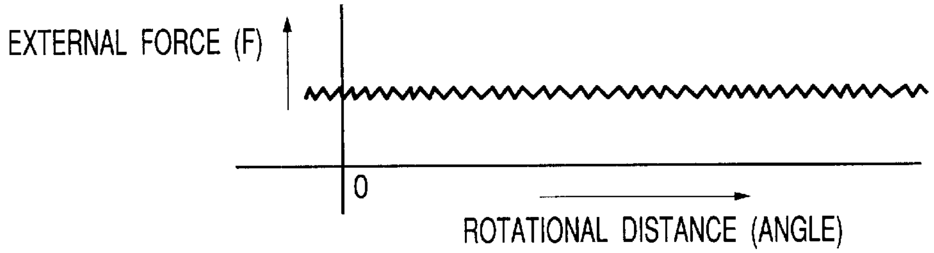
Figure 10C:
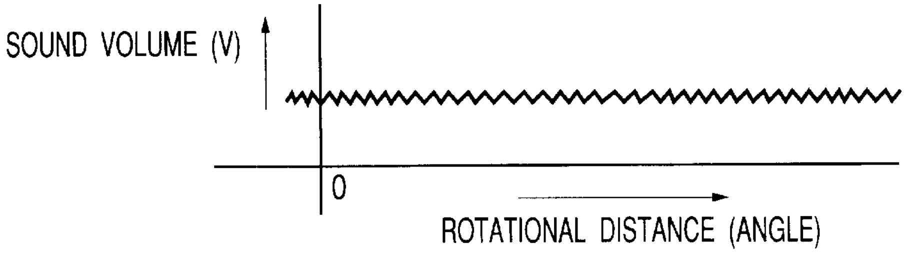
Figure 10D:
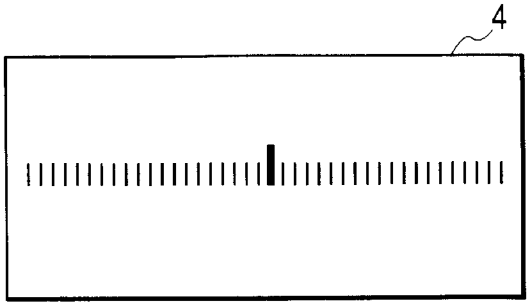
Figure 11:
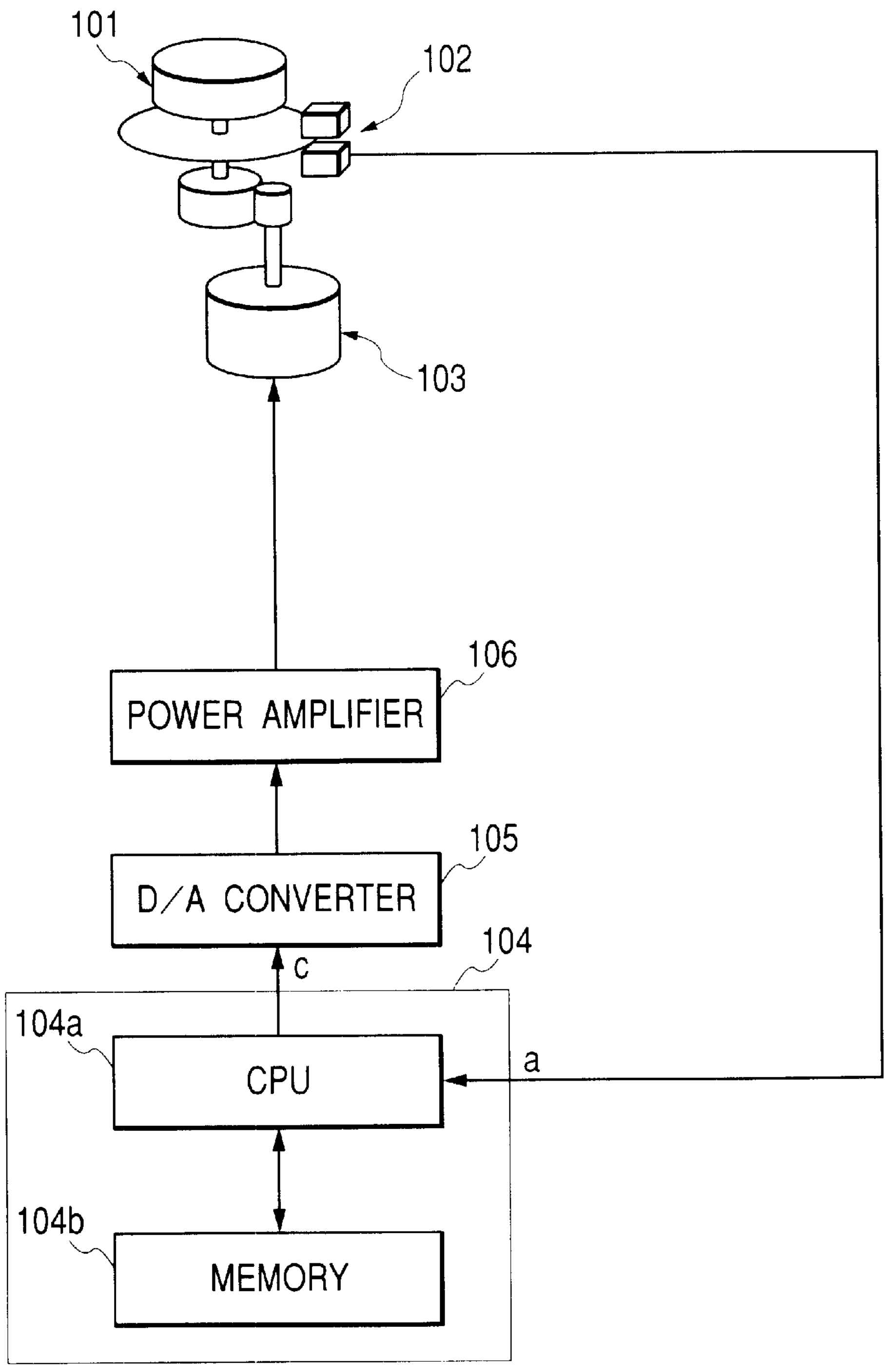
FIG. 11 PRIOR ART
FIG. 11 illustrates the configuration of a manual input device according to the prior art.

The operation of the vehicle-mounted device control unit 41 embodying the invention as described and an example of control over a vehicle-mounted electrical appliance using the vehicle-mounted device control unit 41 will be described with reference to FIG. 5 through FIG. 7. FIG. 5 is a block diagram illustrating the functions of various operating units provided on the vehicle-mounted device control unit embodying the invention; FIG. 6 illustrates the operation that takes place where a joystick type knob is applied for selection of a function and functional regulation of a vehicle-mounted air conditioner; and FIG. 7 illustrates the operation that takes place where a rotary knob is applied for functional regulation of the vehicle-mounted air conditioner.

In this example of control, as shown in FIG. 5, the push-button switch 1*a* provided on the vehicle-mounted device control unit 41 is connected to the air conditioner, the push-button switch 1*b* to the radio, the push-button switch 1*c* to the television, the push-button switch 1*d* to the CD player, the push-button switch 1*e* to the car navigation system, and the push-button switch if to the steering wheel tilting device. By pressing the desired push-button switch, the vehicle-mounted electric appliance connected to the push-button switch can be selected. The manual input device 2 built into the case 42 is used as the functional regulation means for the vehicle-mounted electric appliance selected with the pertinent one of the push-button switches 1*a* through if. Where the air conditioner is selected with the push-button switch 1*a* for instance, a desired one out of the front defroster, rear defogger, temperature regulation and air flow rate regulation can be selected by manipulating the joystick type knob 12, and the temperature or air flow rate of the air conditioner can be regulated by manipulating the joystick type knob 12 or the rotary knob 13.

When the user presses the push-button switch 1*a* to select the air conditioner, the CPU 32 changes over the joystick type knob 12 to the mode of selecting a regulating function, resulting in a state of waiting for a signal from the stick controller (the first detecting device) 16.

As the user swings the joystick type knob 12 in this state, that motion is transmitted to the manipulating lever 16*a* of the stick controller (first detecting device) 16 via a link 19, the encoders or variable resistors 25 and 26 provided on the stick controller 16 are driven, with the result that a first detection signal b1 matching the quantity and direction of the swinging of the joystick type knob 12 is supplied from one of these encoders or variable resistors 25 and 26. The CPU 32, taking in this first detection signal b1, supplies control signals c1, c3 and c4 matching the first detection signal b1 in accordance with pertinent data and programs stored in the memory 33. Further, the first driver circuit 34, the third driver circuit 36 and the fourth driver circuit 37 generate and supply the drive signal d1 for the first actuator 14, the drive signal d3 for the loudspeaker 3 and the drive signal d4 for the display unit 4 respectively matching the control signals c1, c3 and c4 supplied from the CPU 32. This causes the first actuator 14 to be driven and a required external force to be loaded onto the joystick type knob 12, and at the same time a knob working sound associated with the external force loaded onto the joystick type knob 12 is emitted from the loudspeaker 3, together with the displaying of an image associated with the external force loaded onto the joystick type knob 12 on the display unit 4.

FIG. 6(*a*) illustrates the relationship among the direction of operation of the joystick type knob 12 in the mode of selecting a regulating function, the type of the function selected by operating the joystick type knob 12, the external force applied to the joystick type knob 12, and the knob working sound emitted from the loudspeaker 3. In this example, by tilting the joystick type knob 12 forward, backward, leftward or rightward from its central position, the front defroster, rear defogger, temperature regulation or air flow rate regulation can be selected.

Out of the eight graphs shown in FIG. 6(*a*), the four in the bottom part illustrate the relationship between the tilted quantity S1 of the joystick type knob 12 and the external force F working on the joystick type knob 12. As is evident from these graphs, an external force F differing in form with the tilted direction of the joystick type knob 12 is loaded on the joystick type knob 12. Out of the eight graphs shown in FIG. 6(*a*), the four at the top illustrate the relationship between the tilted quantity S1 of the joystick type knob 12 and the volume V of the knob working sound emitted from the loudspeaker 3. As is evident from these graphs, in this example, a knob working sound having the same waveform as that of the external force F working on the joystick type knob 12 is produced in synchronism with the external force F. Further, on the display unit 4, an image showing the electrical appliance selected by manipulating the electrical appliance selection switch 1 (the air conditioner in this example) and the function selected by manipulating the joystick type knob 12 is displayed. This enables the user to sense that he or she has manipulated the joystick type knob 12 in the intended direction even under very adverse conditions such as when running on a rugged road, and to select the desired function without fail.

Incidentally, while the foregoing embodiment of the invention is designed to cause the loudspeaker 3 to produce a knob working sound of the same waveform as that of the external force F working on the joystick type knob 12 in synchronism with the external force F, the purport of the invention is not limited to this, and it would be sufficient for any knob working sound associated with the external force F working on the joystick type knob 12 to be emitted from the loudspeaker 3.

Further, while the foregoing embodiment of the invention is designed to load only an external force matching the direction and quantity of the tilting of the joystick type knob 12, it is possible to prevent the joystick type knob 12 from being manipulated in an inappropriate direction by applying from the first actuator 14, in addition to such an external force, another external force to guide the joystick type knob 12 always only in the appropriate direction, i.e. in the example of FIG. 6(*a*), forward, backward, leftward or rightward from its central position.

The selection of the regulating function, i.e. whichever is desired out of the front defroster, rear defogger, temperature regulation or air flow rate regulation, is finalized by pressing the push-button switch 18, and according to the finalized selection the CPU 32 is connected to the selected electric appliance. The CPU 32, after the selection of the regulating function is finalized, changes over the joystick type knob 12 to the mode of functional regulation, resulting in a state of waiting for a signal from the stick controller 16. As the user swings the joystick type knob 12 in this state, the drive signals d1, d3 and d4 are supplied from the controller 5 in the same manner as for the above-described mode of selecting a regulating function, and the first actuator 14, the loudspeaker 3 and the display unit 4 are driven accordingly.

FIG. 6(*b*) illustrates the relationship among the direction of operation of the joystick type knob 12 in the mode of regulating the temperature of the air conditioner, the type of functional regulation in each direction of operation, the external force applied to the joystick type knob 12, and the knob working sound emitted from the loudspeaker 3. In this example, by tilting the joystick type knob 12 forward from its central position, the temperature is raised, or by tilting it backward, the temperature is lowered.

Out of the four graphs shown in FIG. 6(*b*), the two in the bottom part illustrate the relationship between the tilted quantity S1 of the joystick type knob 12 and the external force F working on the joystick type knob 12. As is evident from these graphs, an external force F differing in form with the tilted direction of the joystick type knob 12 is loaded on the joystick type knob 12. Out of the four graphs shown in FIG. 6(*b*), the two at the top illustrate the relationship between the tilted quantity S1 of the joystick type knob 12 and the volume V of the knob working sound emitted from the loudspeaker 3. As is evident from these graphs, in this example, a knob working sound having the same waveform as that of the external force F working on the joystick type knob 12 is produced in synchronism with the external force F. Further, on the display unit 4, an image showing the electrical appliance selected by manipulating the electrical appliance selection switch 1 (the air conditioner in this example), the regulating function selected by manipulating the joystick type knob 12 (the temperature of the air conditioner in this example) and the type of the function to be regulated by manipulating the joystick type knob 12 (raising or lowering the temperature of the air conditioner in this example) and the change state matching the tilted quantity S1 of the joystick type knob 12 are displayed. This enables the user to sense that he or she has manipulated the joystick type knob 12 in the intended direction and in the desired quantity of tilting even under very adverse conditions such as when running on a rugged road, and to accomplish the desired functional regulation without fail.

In this case, the mode of the external force in selecting the function of the air conditioner and that of the external force in regulating the function of the air conditioner can be either the same or different in manipulating the joystick type knob 12 in the same direction. FIGS. 6(*a*) and 6(*b*) illustrate a case in which they are different.

Unlike in the embodiment of the invention described above, it is also possible to select the function of the air conditioner with the joystick type knob 12 and regulate the function of the air conditioner with the rotary knob 13. In this case, the desired regulating function is selected in the mode of selecting the regulating function and, when the push-button switch 18 is pressed to finalize the selection of the regulating function, the CPU 32 changes over the rotary knob 13 to the mode of functional regulation, and enters into a state of waiting for a signal from the second detecting device 17.

When the user turns the rotary knob 13 in this state, as its motion is transmitted to the drive shaft of the second detecting device 17 via the internal gear 13*a* and the pinion 26 and the drive shaft of the second detecting device 17 is rotationally driven, a second detection signal b2 matching the quantity and direction of the rotation of the rotary knob 13 is supplied from the second detecting device 17. The CPU 32 takes in this second detection signal b2 and supplies the control signals c2, c3 and c4 matching the second detection signal b2, and the second driver circuit 35, the third driver circuit 36 and the fourth driver circuit 37 supply the drive signal d2 for the second actuator 15, the drive signal d3 for the loudspeaker 3 and the drive signal d4 for the display unit 4 respectively matching the control signals c1, c3 and c4 supplied from the CPU 32. This causes the second actuator 15 to be driven and a required external force to be loaded onto the rotary knob 13, and at the same time a knob working sound associated with the external force loaded onto the rotary knob 13 is emitted from the loudspeaker 3, together with the displaying of an image associated with the external force loaded onto the rotary knob 13 on the display unit 4.

FIG. 7 illustrates the operation that takes place where the rotary knob 13 is applied for functional regulation of a vehicle-mounted air conditioner. The temperature of the air conditioner can be raised or lowered, or the air flow rate of the air conditioner can be decreased or increased, by turning the rotary knob 13 leftward or rightward, respectively, from its central position.

Out of the eight graphs shown in FIG. 7, the four graphs in the bottom part illustrate the relationship between the rotational direction and rotated quantity S2 of the rotary knob 13 on the one hand and the pertinent external force F working on the rotary knob 13 on the other. As is evident from these graphs, an external force F differing in form with the rotational direction and rotated quantity S2 of the rotary knob 13 is loaded onto the rotary knob 13. Out of the eight graphs shown in FIG. 7, the four at the top illustrate the relationship between the rotational direction and rotated quantity S2 of the rotary knob 13 on the one hand and the volume V of the knob working sound emitted from the loudspeaker 3. As is evident from these graphs, in this example, a knob working sound having the same waveform as that of the external force F working on the rotary knob 13 is produced in synchronism with the external force F. Further, on the display unit 4, an image showing the electrical appliance selected by manipulating the electrical appliance selection switch 1 (the air conditioner in this example), the regulating function selected by manipulating the joystick type knob 12 (the temperature of the air conditioner in this example) and the varying state of the function to be regulated by manipulating the rotary knob 13 (raising or lowering the temperature of the air conditioner in this example) are displayed. This enables the user to sense that he or she has manipulated the rotary knob 13 in the intended direction and in the desired quantity of rotation even under very adverse conditions such as when running on a rugged road, and to accomplish the desired functional regulation without fail. The mode of the external force when the temperature of the air conditioner is to be regulated and that of the external mode when the air flow rate of the air conditioner is to be regulated may be either the same as or different from each other in the same direction of manipulating the rotary knob 13. FIG. 7 shows a case in which they are different.

Whereas functional regulation of the air conditioner has been described regarding this embodiment of the invention by way of example, the applications of the manual input device embodying the invention are not limited to this example and can include the control of various vehicle-mounted electric appliances including radio, television, CD player, car navigation system, steering wheel tilting device, seat posture regulating device, telephone, voice recognition and gear shift in addition to air conditioner.

FIG. 8 illustrates the operation that takes place where the rotary knob 13 is applied for tuning of a vehicle-mounted radio. FIG. 8A shows the relationship between the rotational direction of the rotary knob 13 and the position on the knob of the one tuned to, out of radio stations 0 through 7; FIG. 8B, the relationship between the rotational position of the rotary knob 13 and the magnitude of the external force applied to the rotary knob 13; FIG. 8C, the relationship between the rotational position of the rotary knob 13 and the volume of the knob working sound emitted from the loudspeaker 3; and FIG. 8D, the radio station displayed on the display unit 4. When the rotary knob 13 is turned, every time a mark 13*a* indicated on the rotary knob 13 arrives at one of predetermined specific rotational positions (0 through 7), a prescribed radio station is tuned to, and an external force is loaded onto the rotary knob 13 as shown in FIG. 8B to give the user a feel of click. Also, a knob working sound is emitted from the loudspeaker 3 as shown in FIG. 8C to aurally reinforce the feel of click given to the user. Further on the display unit 4, as shown in FIG. 8D, an image expressing the radio station tuned to (characters "RADIO NHK AM 1" in this case) is displayed. vehicle-mounted radio. FIG. 8A shows the relationship between the rotational direction of the rotary knob 13 and the position on the knob of the one tuned to, out of radio stations 0 through 7; FIG. 8B, the relationship between the rotational position of the rotary knob 13 and the magnitude of the external force applied to the rotary knob 13; FIG. 8C, the relationship between the rotational position of the rotary knob 13 and the volume of the knob working sound emitted from the loudspeaker 3; and FIG. 8D, the radio station displayed on the display unit 4. When the rotary knob 13 is turned, every time a mark 3*a* indicated on the rotary knob 13 arrives at one of predetermined specific rotational positions (0 through 7), a prescribed radio station is tuned to, and an external force is loaded onto the rotary knob 13 as shown in FIG. 8B to give the user a feel of click. Also, a knob working sound is emitted from the loudspeaker 3 as shown in FIG. 8C to aurally reinforce the feel of click given to the user. Further on the display unit 4, as shown in FIG. 8D, an image expressing the radio station tuned to (character "RADIO NHK AM 1" in this case) is displayed.

FIG. 9 illustrates the operation that takes place where the rotary knob 13 is applied for music selection for a vehicle-mounted CD player. FIG. 9A shows the relationship between the rotational direction of the rotary knob 13 and the position on the knob of the selected one, out of musical numbers 0 through 15; FIG. 9B, the relationship between the rotational position of the rotary knob 13 and the magnitude of the external force applied to the rotary knob 13; FIG. 9C, the relationship between the rotational position of the rotary knob 13 and the volume of the knob working sound emitted from the loudspeaker 3; and FIG. 9D, the state of music selection displayed on the display unit 4. When the rotary knob 13 is turned, every time the mark 13*a* indicated on the rotary knob 13 arrives at one of predetermined specific rotational positions (0 through 15), a prescribed musical number is cued up, and an external force is loaded onto the rotary knob 13 as shown in FIG. 9B to give the user a feel of click. Also, a knob working sound is emitted from the loudspeaker 3 as shown in FIG. 9C to aurally reinforce the feel of click given to the user. Further on the display unit 4, as shown in FIG. 9D, an image expressing the selected musical number (characters "CD SELECTION 5" in this case) is displayed.

FIG. 10 illustrates the operation that takes place where the rotary knob 13 is applied for sound volume regulation of the vehicle-mounted radio or the vehicle-mounted CD player. FIG. 10A shows the relationship between the rotational direction of the rotary knob 13 and the sound volume; FIG. 10B, the relationship between the rotational position of the rotary knob 13 and the magnitude of the external force applied to the rotary knob 13; FIG. 10B, the relationship between the rotational position of the rotary knob 13 and the volume of the knob working sound emitted from the loudspeaker 3; and FIG. 10D, the state of volume regulation displayed on the display unit 4. When the rotary knob 13 is turned, the sound volume of the vehicle-mounted radio or the vehicle-mounted CD player is regulated according to rotational position indicated by the mark 13*a* on the rotary knob 13, and an external force is loaded onto the rotary knob 13 as shown in FIG. 10B to give the user an appropriate feel of resistance. Also, a knob working sound is emitted from the loudspeaker 3 as shown in FIG. 10C to aurally reinforce the feel of resistance given to the user. Further on the display unit 4, as shown in FIG. 10D, an image expressing the state of volume regulation (a "scale visually expressing the sound volume" in this case) is displayed. Although FIG. 10 illustrates a case in which the external force F and the knob working sound V of a fixed wavelength are supplied irrespective of the rotational speed of the rotary knob 13, it is obviously possible to vary the wavelength or the waveform of the external force F and knob working sound V according to the rotational speed of the rotary knob 13.

While it is supposed that in this embodiment of the invention the external force for force feedback use is loaded onto the joystick type knob 12 or the rotary knob 13, a knob working sound to supplement the force feedback to the knobs 12 and 13 is to be emitted from the loudspeaker 3, and an image to supplement the force feedback to the knobs 12 and 13 is to be displayed on the display unit 4, the displaying of the image on the display unit 4 can as well be dispensed with.

Since the vehicle-mounted device control unit embodying the invention is thus able to centrally control a plurality of vehicle-mounted electric appliances, the functional regulation of each vehicle-mounted electric appliance can be readily accomplished, making it possible to enhance the safety of vehicle driving. Further, as what is provided with a plurality of knobs 12 and 13 is used as the manual input device 2, the plurality of knobs 12 and 13 can be differentiated in use according to the type or function of the electric appliance to be regulated, and the vehicle-mounted device control unit can be improved in operating ease and multi-functionalized.

Since the vehicle-mounted device control unit according to the invention is equipped with an electric appliance selection switch, a manual input device, a loudspeaker and a controller, and signals of the same waveform and the same wavelength, both predetermined, are synchronously supplied from the controller to actuators on the manual input device for force feedback use and the loudspeaker, the user can know the manipulated state of the knob according to both the driving forces of the actuators applied to the knob and the sound emitted from the loudspeaker. Therefore, even under very adverse conditions such as when running on a rugged road, the force feedback function of the manual input device can be fully exerted, enabling various operations on various electric appliances to be accomplished quickly and accurately. Moreover, as signals of the same waveform and the same wavelength are synchronously supplied from the controller to the actuators and the loudspeaker, no discrepancy is perceived between the contact force feedback sensed by touching the knob and the aural force feedback sensed by hearing the sound from the loudspeaker, thereby giving the user to feel a satisfactory sense of manipulation.

What is claimed is:

1. A vehicle-mounted device control unit comprising:

an electrical appliance selection switch to select an electrical appliance having various functions;

a manual input device to regulate the various functions of the electrical appliance selected with the switch;

a loudspeaker; and a controller, wherein signals from the electrical appliance selection switch and manual input device are supplied to the controller, the controller controls, manual input device and the loudspeaker, wherein the manual input device is provided with knobs to be manipulated by a user, actuators to load an external force onto the knobs and detecting devices to detect manipulated states of the knobs, and wherein the controller supplies predetermined control signals according to the manipulated states of the knobs to the actuators and the loudspeaker so as to load an external force onto the knobs and cause the loudspeaker to emit sound corresponding to the external force loaded on the knobs.

2. The vehicle-mounted device control unit according to claim 1, wherein the controller synchronously supplies the control signals according to the manipulated states of the knobs to the actuators and the loudspeaker.

3. The vehicle-mounted device control unit according to claim 1, wherein the controller is configured integrally with the manual input device.

4. The vehicle-mounted device control unit according to claim 1, wherein the knobs provided are a joystick type knob and a rotary knob, wherein a first actuator to load an external force onto the joystick type knob and a second actuator to load an external force onto the rotary knob are provided as the actuators, and wherein a first detecting device to detect a manipulated state of the joystick type knob and a second detecting device to detect the manipulated state of the rotary knob are provided as the detecting devices.

5. The vehicle-mounted device control unit according to claim 1, wherein a loudspeaker provided on vehicle-mounted audio equipment is used as the loudspeaker.

6. The vehicle-mounted device control unit according to claim 1, further comprising a display unit, wherein the controller supplies predetermined control signals according to the manipulated states of the knobs to the display unit so as to cause the display unit to display an image corresponding to the external force loaded on the knobs.

7. The vehicle-mounted device control unit according to claim 2, wherein the controller synchronously supplies the control signals according to the manipulated states of the knobs to the actuators, and the display unit.

8. The vehicle-mounted device control unit according to claim 2, wherein the controller synchronously supplies the control signals according to the manipulated states of the knobs to the actuators and the loudspeaker.

9. The vehicle-mounted device control unit according to claim 2, wherein the controller is configured integrally with the manual input device.

10. The vehicle-mounted device control unit according to claim 2, wherein the knobs provided are a joystick type knob and a rotary knob, wherein a first actuator to load an external force onto the joystick type knob and a second actuator to load an external force onto the rotary knob are provided as the actuators, and wherein a first detecting device to detect a manipulated state of the joystick type knob and a second detecting device to detect a manipulated state of the rotary knob are provided as the detecting devices.

11. The vehicle-mounted device control unit according to claim 2, wherein a loudspeaker provided on vehicle-mounted audio equipment is used as the loudspeaker.

12. A vehicle-mounted device control unit comprising:

an electrical appliance selection switch to select an electrical appliance having various functions;

a manual input device to regulate the various functions of the electrical appliance selected with the switch;

a display unit; and a controller, wherein signals from the electrical appliance selection switch and manual input device are supplied to the controller, the controller controls the manual input device and the display unit, wherein the manual input device is provided with knobs to be manipulated by a user, actuators to load an external force onto the knobs and detecting devices to detect manipulated states of the knobs, and wherein the controller supplies predetermined control signals according to the manipulated states of the knobs to the actuators and the display unit so as to load an external force onto the knobs and cause the display unit to display an image corresponding to the external force loaded on the knobs.

13. The vehicle-mounted device control unit according to claim 12, wherein the controller synchronously supplies the control signals according to the manipulated states of the knobs to the actuators and the display unit.

14. The vehicle-mounted device control unit according to claim 12, wherein the controller is configured integrally with the manual input device.

15. The vehicle-mounted device control unit according to claim 12, wherein the knobs provided are a joystick type knob and a rotary knob, wherein a first actuator to load an external force onto the joystick type knob and a second actuator to load an external force onto the rotary knob are provided as the actuators, and wherein a first detecting device to detect a manipulated state of the joystick type knob and a second detecting device to detect the manipulated state of the rotary knob are provided as the detecting devices.

* * * * *

UNITED STATES PATENT AND TRADEMARK OFFICE

CERTIFICATE OF CORRECTION

PATENT NO. : 6,694,236 B2
DATED : February 17, 2004
INVENTOR(S) : Mikio Onodera

It is certified that error appears in the above-identified patent and that said Letters Patent is hereby corrected as shown below:

Title page,
Item [56], References Cited, U.S. PATENT DOCUMENTS, insert:
-- 6,219,033 B1 04/2001 Rosenberg et al. 345/157 --.
FOREIGN PATENT DOCUMENTS, insert:
-- FOREIGN PATENT DOCUMENTS
Japanese Unexamined Patent Publication No. 2000-149721 05/2000 Japan --.

Column 14,
Line 45, immediately after "controls" delete "," (comma), and before "manual input" insert -- the --.

Column 15,
Lines 17, 21, 25, 28 and 38, before "wherein" delete "claim 2," and substitute -- claim 6, -- in its place.

Signed and Sealed this

Twenty-seventh Day of July, 2004

JON W. DUDAS
*Acting Director of the United States Patent and Trademark Office*